United States Patent
Kikugawa et al.

(10) Patent No.: US 7,791,993 B2
(45) Date of Patent: Sep. 7, 2010

(54) OPTICAL DISC DRIVE PROVIDED WITH ENVELOPE DEFECT DETECTION FUNCTION

(75) Inventors: Atsushi Kikugawa, Tokyo (JP); Takahiro Kurokawa, Fujisawa (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 855 days.

(21) Appl. No.: 11/704,964

(22) Filed: Feb. 12, 2007

(65) Prior Publication Data

US 2008/0130442 A1 Jun. 5, 2008

(30) Foreign Application Priority Data

Dec. 5, 2006 (JP) .............................. 2006-328351

(51) Int. Cl.
G11B 15/52 (2006.01)
(52) U.S. Cl. ................................. 369/47.14; 369/53.15
(58) Field of Classification Search ........................ None
See application file for complete search history.

(56) References Cited

U.S. PATENT DOCUMENTS

| 2001/0055247 A1* | 12/2001 | Tateishi et al. ........... 369/44.32 |
| 2003/0141997 A1 | 7/2003 | Kawabe |
| 2005/0013219 A1* | 1/2005 | Honobe ................... 369/47.28 |
| 2005/0270942 A1* | 12/2005 | King et al. ............... 369/53.15 |
| 2006/0104177 A1* | 5/2006 | Mitsui ..................... 369/53.15 |
| 2006/0133248 A1* | 6/2006 | Ueda et al. ............... 369/53.15 |

FOREIGN PATENT DOCUMENTS

| JP | 08-096361 | 4/1996 |
| JP | 2003-030850 | 1/2003 |
| JP | 2005-141868 | 6/2005 |
| JP | 2006-099863 | 4/2006 |
| JP | 2006-286112 | 10/2006 |

OTHER PUBLICATIONS

U.S. Appl. No. 11/488,625, filed Jul. 19, 2006, Kikugawa, et al.

* cited by examiner

Primary Examiner—Paul Huber
(74) Attorney, Agent, or Firm—Antonelli, Terry, Stout & Kraus, LLP.

(57) ABSTRACT

The present invention is to detect an envelope defect of a read signal due to a fingerprint on a surface of a disc, an inter-layer interference of a dual disc, or the like which is a factor of a read error of an optical disc, and is to improve a read capability of an optical disc drive while avoiding a read error by performing an appropriate processing. Means for detecting an envelope defect and means for counting the number of appearances of the envelope defect are included in the present invention. A read condition for factors of a read error is set at the time of a read retry, and a read condition suitable for the decoding of a readout signal containing an envelope defect is set at the time of detection of the envelope defect in the present invention.

10 Claims, 11 Drawing Sheets

1:disc, 2:pickup, 100:read channel, 102:ECC decoder, 103: defect detector, 104:controller

FIG. 11

| speed | High-pass filter cutoff | Tracking gain |
|---|---|---|
| 4X | UP (50kHz, 100kHz) | default |
| 4X | default | UP (1 to 3 dB) |
| 4X | UP (50kHz, 100kHz) | UP (1 to 3 dB) |
| 2X | UP (50kHz, 100kHz) | default |
| 2X | default | UP (1 to 3 dB) |
| 2X | UP (50kHz, 100kHz) | UP (1 to 3 dB) |

FIG. 12

| speed | Tracking gain | Focusing gain |
|---|---|---|
| 4X | UP (1 to 3 dB) | default |
| 4X | default | UP (1 to 3 dB) |
| 4X | UP (1 to 3 dB) | UP (1 to 3 dB) |
| 2X | UP (1 to 3 dB) | default |
| 2X | default | UP (1 to 3 dB) |
| 2X | UP (1 to 3 dB) | UP (1 to 3 dB) |

FIG. 13

| Tracking gain | Focusing gain | Adaptive Viterbi decoder study time constant | Adaptive EQ study time constant |
|---|---|---|---|
| DOWN (1 to 3 dB) | default | default | default |
| DOWN 3 dB | default | 70% | default |
| DOWN 3 dB | default | default | 70% |
| DOWN 3 dB | default | 50% | default |
| DOWN 3 dB | default | default | 50% |
| DOWN 3 dB | DOWN 3 dB | default | default |

*Iterate each settings for three time.

FIG. 14

| speed | Analog equalizer boost | High-pass filter cutoff | notice |
|---|---|---|---|
| 4X | UP (1 to 3 dB) | default | Stabilize PLL (SNR) |
| 4X | default | UP (50kHz, 100kHz) | Suppress baseline fluctuation (fingerprint) |
| 4X | UP (1 to 3 dB) | UP (50kHz, 100kHz) | Execute all combinations |
| 2X | UP (1 to 3 dB) | default | |
| 2X | UP (1 to 3 dB) | UP (50kHz, 100kHz) | Execute all combinations | ced, and consequently, readout becomes extremely difficult in some cases. While the scope of the present invention is not limited to BDs, description given below is directed to BDs and terminology used herein is also based on those used for BDs.

OPTICAL DISC DRIVE PROVIDED WITH ENVELOPE DEFECT DETECTION FUNCTION

CLAIM OF PRIORITY

The present application claims priority from Japanese application JP2006-328351 filed on Dec. 5, 2006, the content of which is hereby incorporated by reference into this application.

BACKGROUND OF THE INVENTION

1. Field of the Invention

The present invention relates to an optical disc drive.

2. Description of the Prior Art

One remarkable feature of optical disc devices and discs such as DVDs and Blu-ray Discs (abbreviated as "BDs") which are compliant with specifications is that recording media are exchangeable and that it is possible to interchange the discs between different kinds of machines and to perform recording on and reading out from the discs. However, surfaces of recorded discs get scratched and dirty as a matter of practice and consequently, readout becomes extremely difficult in some cases. While the scope of the present invention is not limited to BDs, description given below is directed to BDs and terminology used herein is also based on those used for BDs.

For a disc which is not in good condition due to the presence of a defect, grime and the like, measures are taken not to have a read error to the utmost extent at the time of readout. For example, when there is grime on the surface of a disc by which read signals are mostly blocked, it is possible to make the influence due to the defect to the minimum by employing a defect detection technology like described in Japanese Patent Application Laid-open No. 2003-30850. It has been known for those skilled in the art that similar technologies are generally used for optical discs. As shown in FIG. 2, an outline of the above is that the top envelope of a readout signal is monitored and that a defect detection signal is outputted when the amplitude is less than or equal to a threshold for more than a certain period of time. While the defect detection signal is outputted, the controlling of tracking or focusing is held, and a phase locked loop (abbreviated as a "PLL") of a readout signal processing system is also held, whereby these unfavorable operations caused by those defects are prevented from being performed so that its influence is retained to the minimum.

When a read error occurs except for the time of a stream read or the like, a read retry is in general performed to obtain data of a recording unit block (abbreviated as a "RUB") corresponding to the error. Heretofore, when performing a read retry, it has been performed according to a retry parameter list prepared in advance without identifying factors of the read error. Consequently, an effective read retry suitable against a cause of the read error is not necessarily performed.

Apart from local factors such as a defect and the like on a disc, there are phenomena that deteriorate the read capability over a considerably large area due to the structure of the disc such as an inter-layer interference of a dual layer disc. FIG. 3 is a view for showing an example in which a readout signal is disturbed by an inter-layer interference. This is the example in which a readout is performed on an L1 layer, i.e. a layer close to a surface, of a rewritable dual layer Blu-ray disc. It can be seen from the drawing that both top and bottom envelopes, which are supposed to be approximately flat, are being subjected to a large external disturbance due to an inter-layer interference. When reading out the L1 layer, a reading light is focused on the layer. Part of the reading light transmits the L1 layer, and it is reflected on the L0 layer, thereof reaching a photodetector of an optical head. Since the lights from both the L0 and L1 layers reach the photodetector at the same time, interference occurs between the lights. Moreover, a distance between the L0 layer and the L1 layer is slightly different at every position on a disc in general. When reading out the disc under such a condition, an interference pattern caused by the lights from the both L0 and L1 layers on the photodetector changes with time. As a result, a disturbance of a readout signal as shown in FIG. 3 occurs. When the disturbance of the signal occurs as shown in FIG. 3, a signal recorded on the part of disturbance cannot be correctly decoded as in the case of the defect, hence resulting in a burst error. In the case of the example shown in FIG. 3, a burst error having a length of several hundreds bytes occurs. Such a length brings no problem in readout so long as the capability of an error correction code of a BD system is concerned. However, when reading an area where the distance between layers changes rapidly in a tangential direction of the disc, the state of the interference on the photodetector changes more drastically than otherwise. Accordingly, signal disturbances as shown in FIG. 3 appear more frequently, thus plural of them will appear within a RUB. Under such a circumstance, a probability in which read errors occur is no longer negligible.

SUMMARY OF THE INVENTION

Objects to be achieved by the present invention are to enable the avoiding of read errors which are caused by fingerprints on a surface of a disc, an inter-layer interference of a dual layer disc, and the like, and the avoiding of decreasing of a read capability which is caused by fingerprints on a surface of a disc, an inter-layer interference of a dual layer disc, and the like.

To achieve the above-described objects, an optical disc drive of the present invention detects envelope defects, and counts the number of appearances of the defects. It has means which sets a read condition suitable against a read error factor when performing a read retry, with which a read condition suitable for decoding a readout signal having envelope defects is set when detecting the envelope defects.

The present invention makes it possible to increase the capability of handling read errors due to the envelope defects of readout signals, which defects are caused by fingerprints on a surface of a disc, an inter-layer interference of a dual layer disc, and the like.

BRIEF DESCRIPTION OF THE DRAWINGS

FIG. 11 is a view for showing an example of a retry list for fingerprints.

FIG. 12 is a view for showing an example of a retry list for deviations.

FIG. 13 is a view for showing an example of a retry list for defects.

FIG. 14 is a view for showing an example of a retry list for SNR shortages.

DESCRIPTION OF THE PREFERRED EMBODIMENTS

Embodiments of the present invention are described below with reference to the accompanying drawings.

First Embodiment

Figure 1:
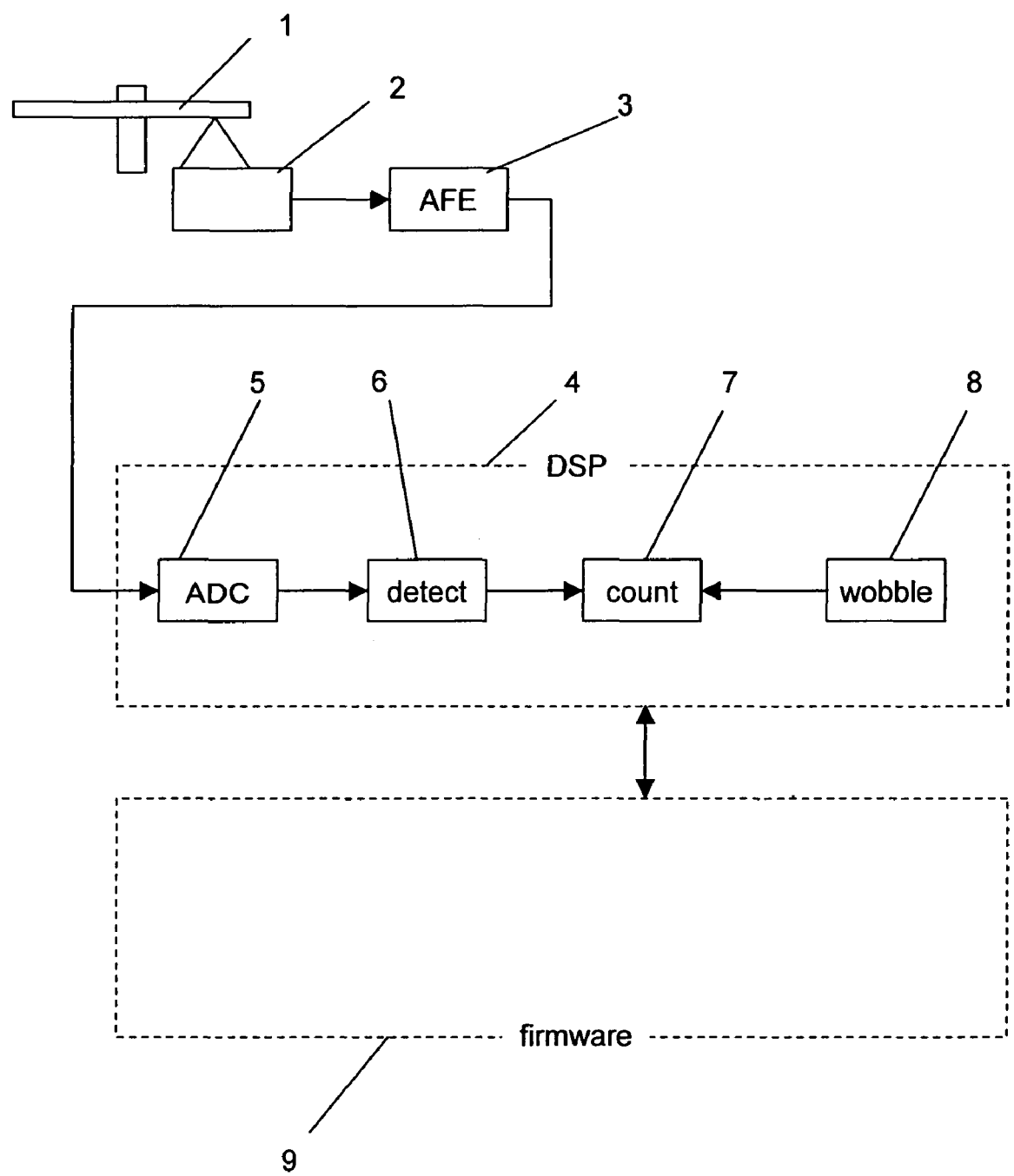
FIG. 1 is a diagrammatic block diagram showing an optical disc drive of the present invention.

FIG. 1 is a diagrammatic block diagram showing an optical disc drive of the present invention. FIG. 1 shows only part necessary to be described with respect to the present invention, and the drawing of the other parts is omitted. In the same manner, detail descriptions of parts which those skilled in the art can easily understand are also omitted.

First, an outline of operations is described. Information recorded on an optical disc 1 is optically read out by a pickup 2, and converted into an electric signal (a readout signal). The readout signal is amplified to one having a fixed amplitude in an analog front end (abbreviated as an "AFE") IC3 and, thereafter, converted into a digital signal by an analog to digital converter (abbreviated as an "ADC") 5 in a digital signal processor (abbreviated as a "DSP") 4. In the present invention, envelope defects of the readout signal are detected from the signal after digitization by using an envelope defect detector 6. A specific description of the detection is described later. An envelope defect counter 7 counts the number of detected envelope defects. Signals which instruct a start, stop, reset and the like of the counter is supplied from a wobble module 8. In the DSP, various kinds of settings are made by a firmware 9 which controls the entire drive.

Next, the detection of an envelope defect is described with reference to FIG. 4. In this respect, it is assumed that a defect exists only on a top envelope. The envelope defect detector 6 constantly monitors the levels of top and bottom envelopes of a readout signal. As to the respective amplitudes of the top and bottom envelopes (one-side amplitudes), an upper threshold and a lower threshold are capable of being set. Specifically, a defect in which an envelope is so bulged outside that the amplitude becomes greater than the upper threshold is termed as a "peak," and a defect in which the amplitude decreases so that it becomes smaller than the lower threshold is termed as a "valley." Thus, in an example in FIG. 4, the top envelope shows defects representing both the peak and valley.

Figure 4:
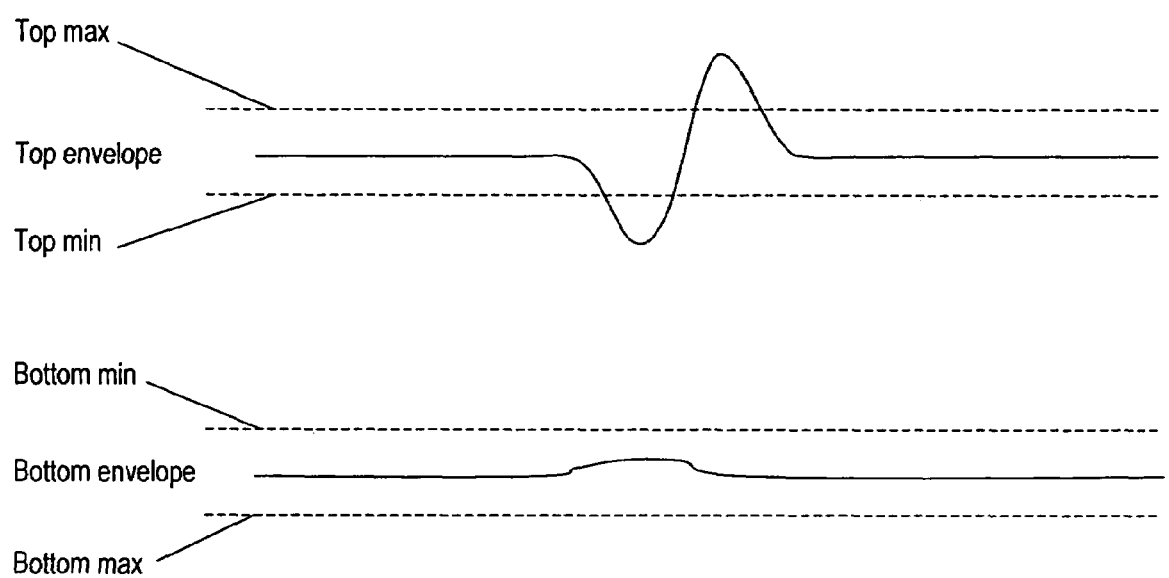
FIG. 4 is a view for showing a method of detecting an envelope defect.

FIG. 4 gives a description using the envelopes. A method that detect envelope defects from envelopes which are directly obtained by digital signal processing of the sampled signal, which is acquired by analog-to-digital (abbreviated as "AD") conversion, is described in Japanese Patent Application Laid-open No. Hei 8-96361. Use of the above technology enables the capturing of a phenomenon which is extremely fast compared with one which can be captured by a defect detection system using conventional analog signal processing. However, this system requires large numbers of elements being operative at the channel clock frequency, and consequently, it presents the problems that power consumption becomes large and that circuit designs become complicated.

Figure 5:
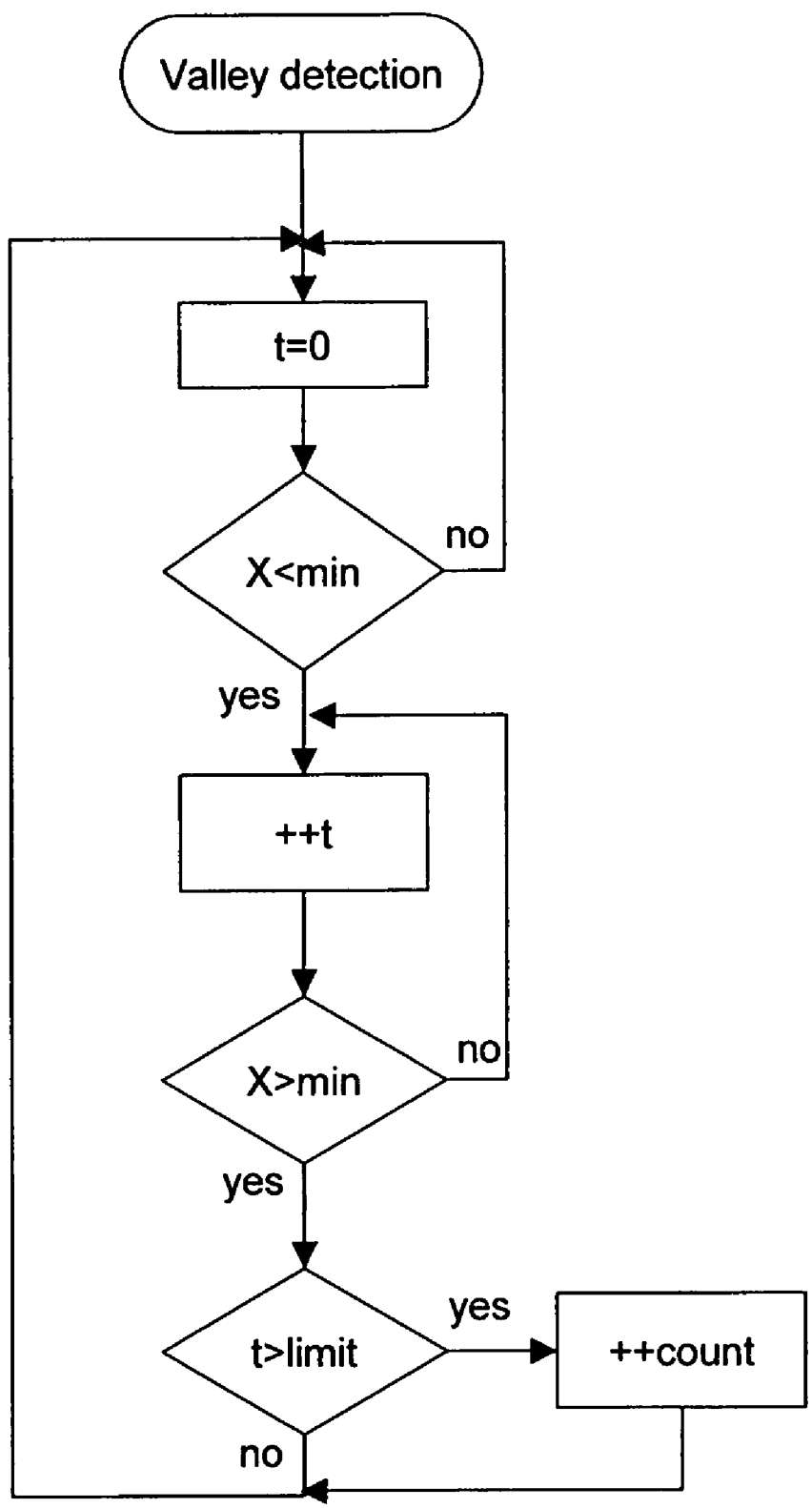
FIG. 5 is a view for showing a method of detecting a valley.

For this reason, an envelope defect is detected by a simpler method as shown in FIG. 5 in the present embodiment. Specifically, in a case of detecting valleys, the time t is counted during while the sampled value, x, are lower than the threshold (min). In a case where the time t exceeds the specified period of time (time threshold (limit)), it is determined that the valley has been detected. Thereafter, when a sampled value, which is greater than or equal to the threshold, is observed again, it is determined that the valley is terminated. The time threshold should be specified considering the characteristics of the readout signal because the readout signal itself is handled. That is, since it is likely in general that the shortest marks appear successively, the setting of a time threshold being too short needs to be avoided.

Figure 6:
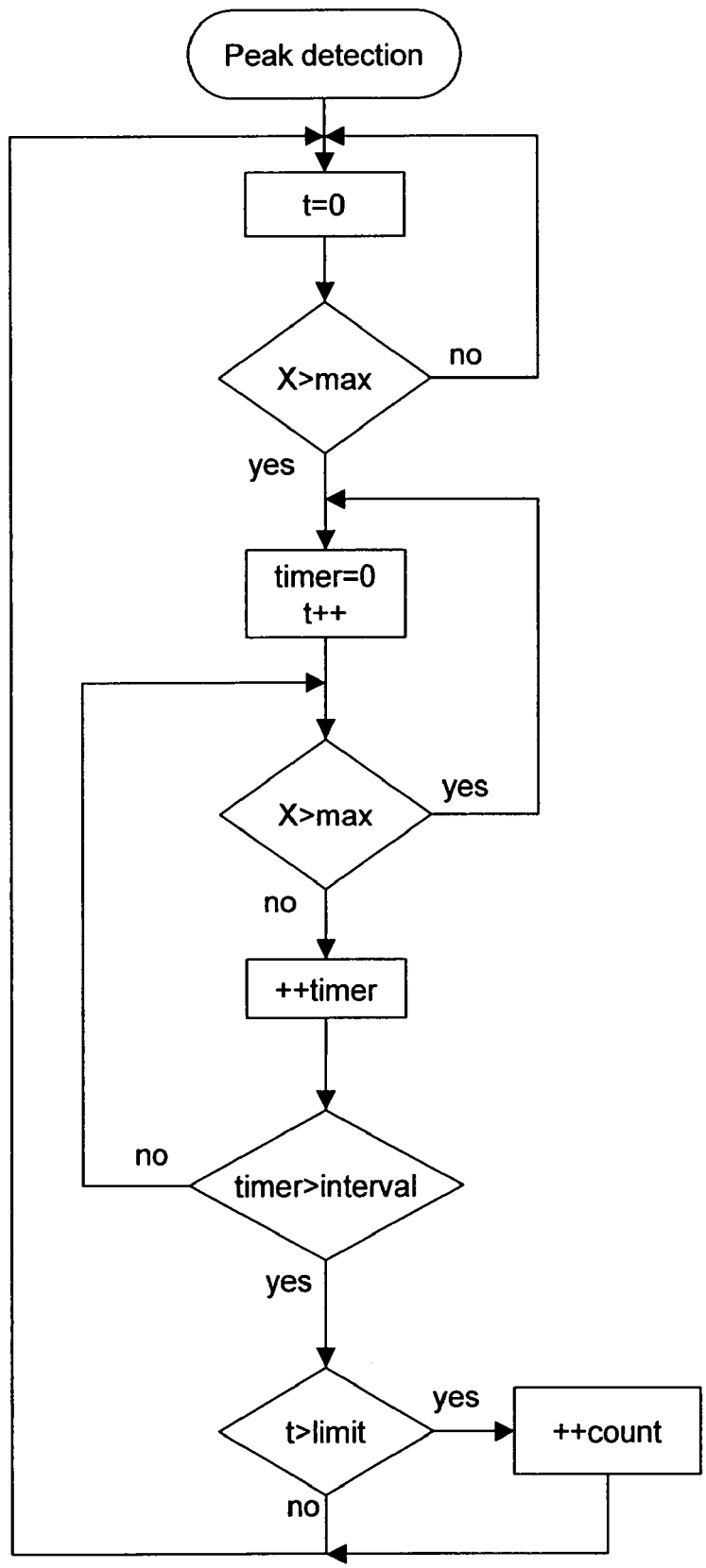
FIG. 6 is a view for showing a method of detecting a peak.

Next, a detection of a peak is described with reference to FIG. 6. When detecting a peak, it does not normally occur that a sampled value has exceeded a threshold and, thereafter, all sampled values successively exceed the threshold on a peak. Accordingly, the timer is started after a sampled value, x, exceeds a threshold (max). Thereafter, in a case where a sampled value which is larger than the threshold is not subsequently observed again within a specified time (interval), it is determined that the peak has terminated. In a case where one is observed, the timer is reset, and the monitoring of sampled values is again started. When it is determined that the peak has been terminated, in a case where a period of time during which the peak lasts is greater than or equal to the specified time, it is determined that the peak has existed during the period of time.

Figure 7:
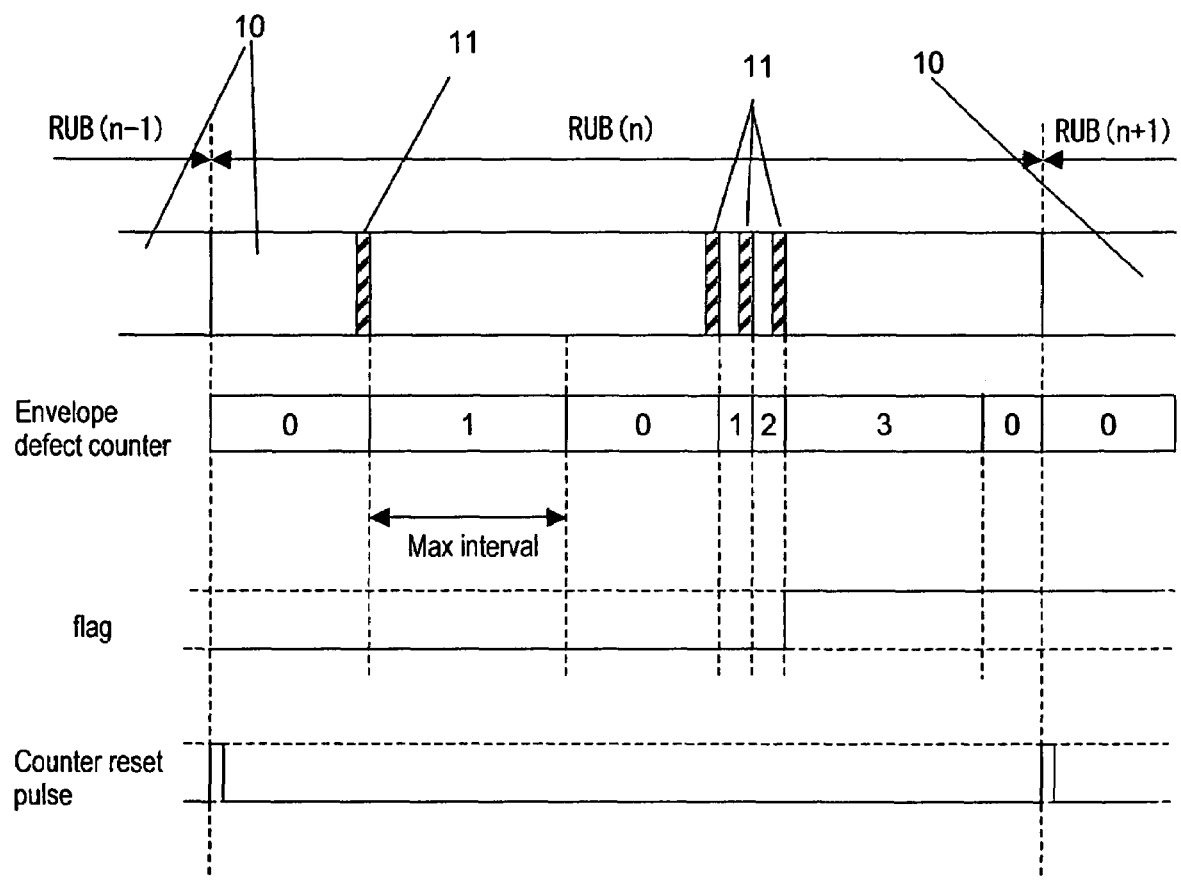
FIG. 7 is a view for showing a method of counting the envelop defects.

The counting of the number of envelope defects and the discriminating of factors thereof are described below. As shown in FIGS. 5 and 6, when it is decided that there is a peak or a valley, the count value of the envelope defect counter 7 is increased by one. The target to be counted is selected in advance from a peak, a valley, or both a peak and a valley. A "maximum appearance interval" is a variable which controls the continuation of the counting of the number of envelope defects. The envelope defect counter 7 is reset, when an envelope defect is detected and the next envelope defect is not detected before exceeding the maximum appearance interval. Because of this, as described by an example in FIG. 7, when the first envelope defect is detected, the value of the envelope defect counter 7 becomes 1 and, thereafter, the value is returned to 0 after the maximum appearance interval. In FIG. 7, reference numeral 10 designates RUB and reference numeral 11 designates an envelope defect. The "threshold of the number of appearances" is a threshold for setting a fingerprint detection flag in a case where the envelope defect counter 7 takes a value being greater than or equal to the threshold of the number of appearances. Use of these enables discrimination between envelope defects occurred at small intervals due to fingerprints or the like and those occurred intermittently due to dust or the like. In the example of FIG. 7, the threshold of the number of appearances is specified as 3 and, thus, when a third envelope defect is counted among a second group of envelope defects, the fingerprint detection flag is set. Incidentally, the envelope defect counter 7 is automatically reset at a RUB boundary. A reset signal is received from the wobble module 8. The wobble module 8 analyzes a wobble signal from a disc, and identifies a RUB boundary. Since this is well known for those skilled in the art when using recordable discs for BDs, it is not described here. There is no wobble for discs for read only discs. In this case, a RUB boundary is identified by using a result of a format analysis of an error correction code (abbreviated as an "ECC") decoder.

(Listing Method for Each Factor and Detection of Factors)

Next, a method of using a fingerprint detection flag is described. In the present embodiment, a method that discriminates the read error factors at the time of a read retry, and a retry processing is performed on the basis of the discrimination result. The fingerprint detection flag is used for the discriminating of factors of read errors.

The read errors factors are roughly classified into four categories: fingerprints, defects, deviations and SNR shortages. Among those, defects and deviations have been heretofore capable of being detected with sufficient reliability. In addition to these, the present invention enables detection of fingerprints with high accuracy. Note that, even if a phenomenon is not one caused by a fingerprint, the fingerprint detection flag detects the phenomenon which has an influence similar to that of a fingerprint on readout signals. That is, the phenomenon is the foregoing inter-layer interference on a multi-layered medium, a plurality of scratches located at small intervals, or the like. As described later, since most of countermeasures for read errors caused by the above are the same as that for fingerprints, these are treated in the same category as that of fingerprints. When a factor is expressed as a fingerprint, it includes the inter-layer interference and the like, unless specially stated otherwise.

The factors of read errors designate hereinafter a fingerprint, a defect, a deviation and a SNR shortage, unless specially stated otherwise. A retry parameter list prepared for each factor is applied, whereby a more effective retry operation than a conventional one is performed.

Figure 8:
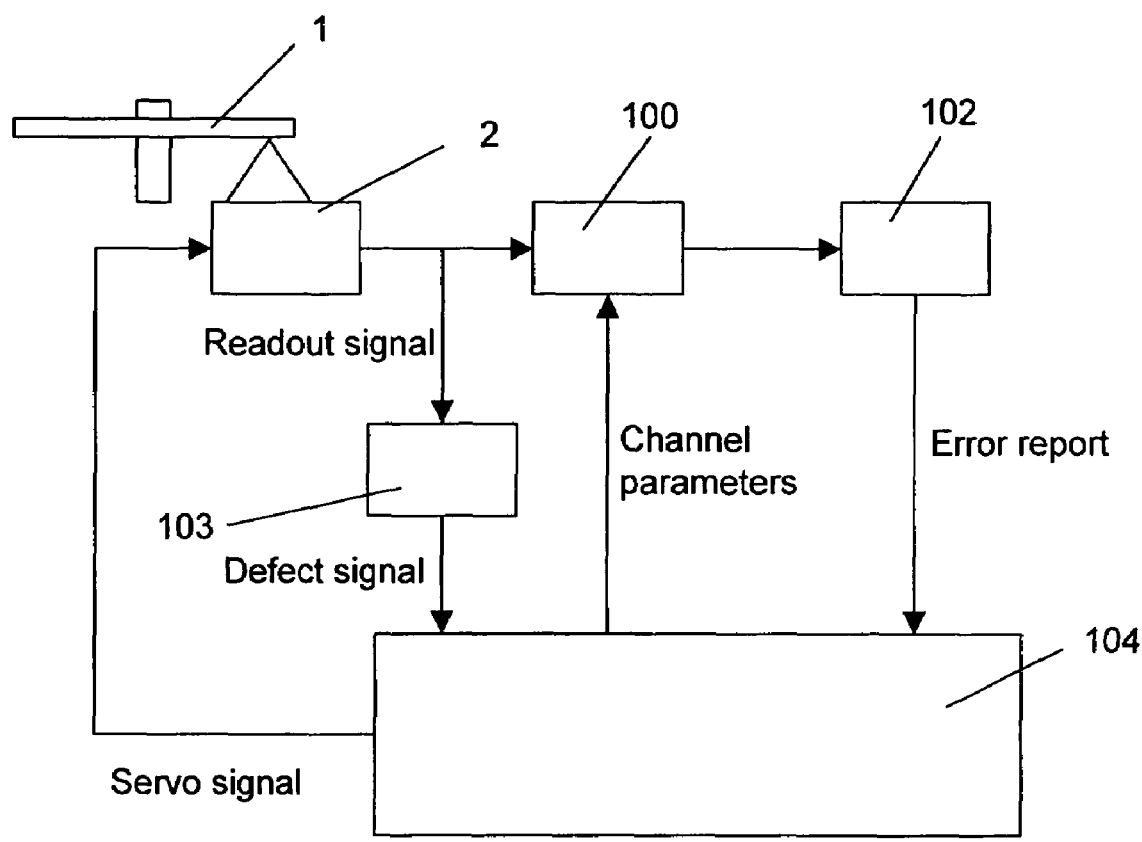
FIG. 8 is a diagrammatic block diagram for showing an optical disc drive which discriminates factors of read errors and performs a read retry based on the discrimination.

FIG. 8 is a diagrammatic block diagram for showing an optical disc drive which performs retry-processes corresponding to each read error factor. FIG. 8 shows only part necessary to be described with respect to the present invention, and the drawing of the other part is omitted. In the same manner, detail descriptions of parts which those skilled in the art can easily understand are also omitted.

Information recorded on the disc 1 is optically read out with the pickup 2 and converted into an electric signal. The signal is, thereafter, inputted to a read channel 100 which is a signal processing system. The signal is binarized by the read channel 100. Thereafter, error correction processing and the like are performed on the signal by using an ECC decoder 102, whereby user data are taken out. The ECC decoder 102 outputs an error report to the controller 104. In the controller 104, the number of symbol errors detected is counted. The above is an outline of usual read operations, and these operations are automatically performed in general according to sequences incorporated in an LSI.

Figure 9:
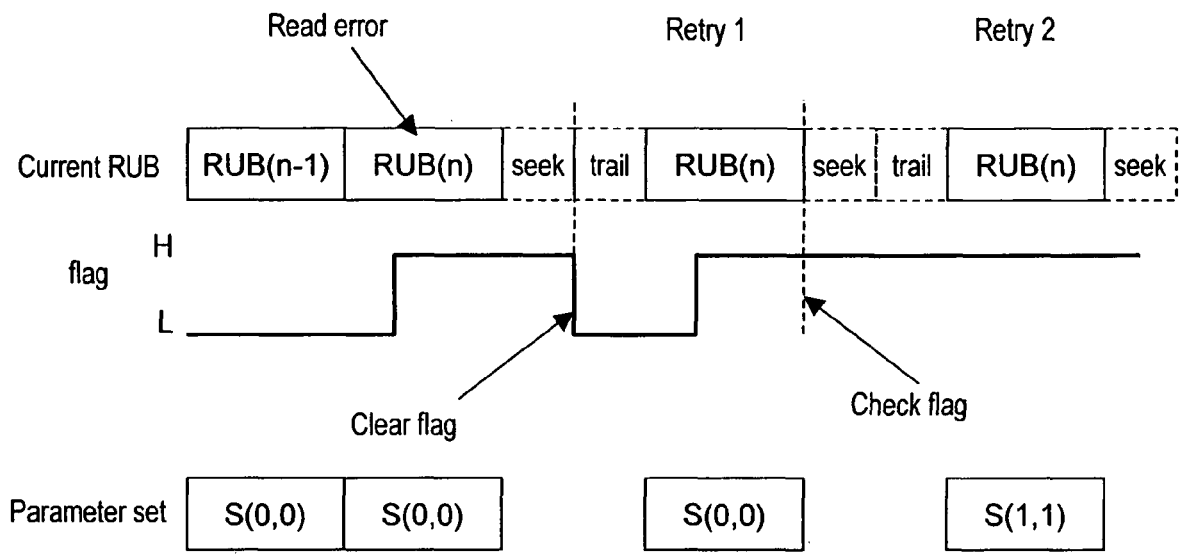
FIG. 9 is a view for showing a procedure of a read retry to be performed by using a discrimination of a factor.

Next, the detection of read error factors and read retry operations following the detecting thereof are described. Here, a description for the above is given for the case where a factor to be detected is only a defect for the sake of simplicity. FIG. 9 is a view for describing the setting of read parameters and the impetus to the setting. The top drawing indicates recording unit blocks (RUBs) in which read is being performed; the drawing below the top one indicates the state of the defect detection flag; and the bottom drawing indicates the sets of read parameters used at that time.

It is now assumed that a read error has occurred on RUB(n) while RUB(n-2), RUB(n-1) and RUB(n) are successively read. When a read error has occurred, the controller 104 starts retry operations. A first retry is to perform a simple retry. To read the RUB(n) again, it is necessary to perform a seek operation. In a seek operation, the position of the pickup is moved back several clusters before the target cluster, and from that position, the pickup tracks the track to reach the target cluster. At that time, as shown in FIG. 9, the defect detection flag is reset at the end of the seek. At the end of the first retry, the defect detection flag is referred, whereby it is decided whether there is a defect in the target area.

Figure 2:
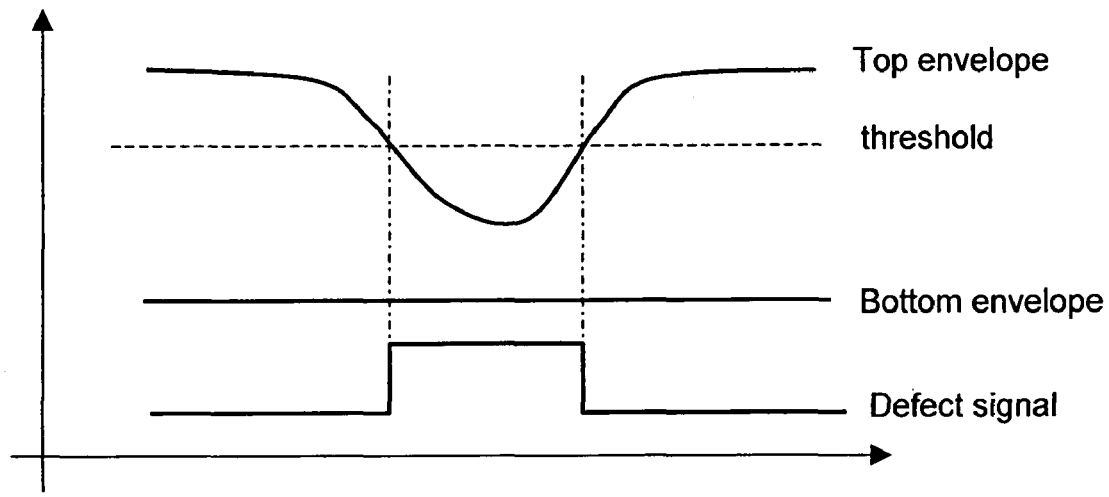
FIG. 2 is a view for showing a method of detecting a defect.
Figure 3:
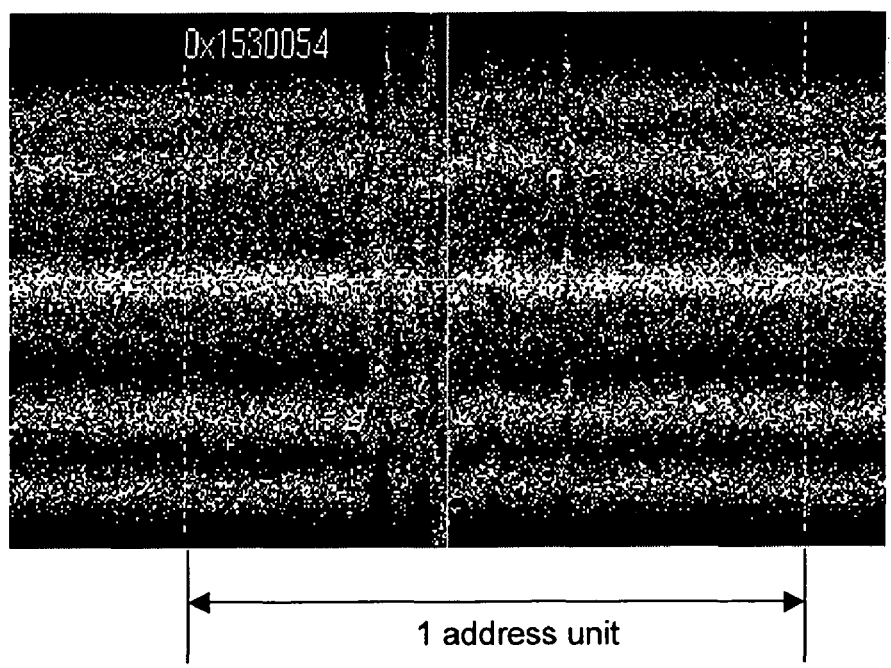
FIG. 3 is a view for showing an example in which a readout signal is disturbed by an inter-layer interference.

Detection of defects is performed by using a defect detector 103. This is a circuit which monitors the top envelope of the read signal as shown in FIG. 2, and outputs a defect detection signal when the amplitude thereof is less than or equal to the threshold for more than a certain period of time. Furthermore, when the defect detection signal is outputted for more than a certain period, the defect detection flag is set. Note that, once a defect is detected, thereafter, the defect detection flag is maintained at the high level until being reset. This secures that the state of the defect detection flag at the end of the first retry can reflect whether there was a defect within the end of the seek to the end of the cluster on which a retry is being performed. The reason why the timing of the defect detection flag reset is set before the target cluster is that there are cases read errors being caused as a result of jumping to a non-target track due to the influence of a defect existing before the target cluster.

If a read error has occurred again at the first retry (a simple retry), a retry operation is performed based on a result of a factor detection flag. Now, since the factor to be detected is only defects, factors are classified into defects and others. A read parameter list at the time of retries for each factor is represented as S ((factor number),(trial number)). The read parameter list at the time of usual read is represented as S(0,0). The factor numbers for the defects and the others are allocated respectively as 1 and 2. When the defect detection flag is set, the second retry and subsequent retries are performed in the sequence of S(1,0), S(1,1) and S(1,2) of the parameter lists until a successful readout is achieved.

Incidentally, it is easily understood by those skilled in the art that the controller 104 consists of, as hardware, a microcomputer, a feedback controller, a universal memory and the like, its operation being controlled by a firmware, and further that it also includes a read parameter set and the like at the time of retries.

In the example of FIG. 8, only defects are used for discriminating factors. Even if a fingerprint detection mechanism and a deviation detector for tracking and focusing are added in the example, the foregoing description can be applied almost as it is. In that case, the classification of the factors includes fingerprints, defects, deviations, SNR shortages and others. A deviation is detected when the amplitude of the error signal in the tracking feedback control circuit exceeds the specified value. Deviations of tracking and focusing can be detected individually. However, the frequency of occurrence of read error, cause of which is a deviation, is much greater in tracking deviation. Thus, retry lists on tracking and focusing deviations are put together into one list for the sake of a simplification of the system. Accordingly, the same list is performed irrespective of whichever deviation is detected.

There are plural factor to be detected, and there is a possibility that plural of them are detected at the same time. For the case where the plural factors of read errors are detected at the same time, detection priority is determined in advance. In a case where defects and deviations are detected at the same time, the defects takes over the deviation. This is because large tracking errors often occur immediately after the reading-optical-spot passes over a long defect, and even if the essential read error factor is a defect, it often occurs that a deviation is also detected at the same time.

A fingerprint has a defective element due to a local decrease in light and a deviation element occurred by the refraction of the read light. In the case of the defective decrease in light, since its period of continuation is short, a defect detection flag is not set in many cases. However, the defect is detected in some cases depending on a condition of the fingerprint. On the other hand, the fingerprint is not detected due to the deviations or the defects. Therefore, when the defect or the deviation is detected at the same time as the fingerprint, the fingerprint takes over the others.

(Contents of Lists for Each Factor)

Contents of the retry lists for each factor are described below. First, a description is given in a case where a fingerprint flag is detected.

Figure 10:
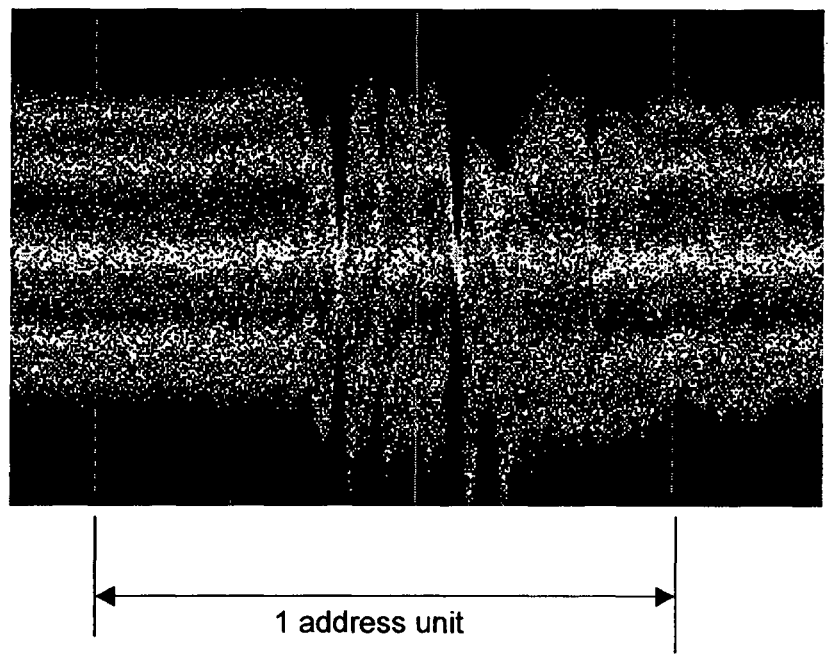
FIG. 10 is a view for showing an example of an envelope defect occurred due to a fingerprint.

FIG. 10 is a view for showing an example of a readout signal when an area on which a fingerprint is stuck is read. It is seen that a plural valleys appear in relatively short sections. When there is such an envelope defect, operation accuracy of the automatic gain controlled (abbreviated as an "AGC") amplifier in the AFE-IC may be deteriorated. To reduce such an influence, the cut-off frequency of the high-pass filter of the AGC amplifier input is increased usual. Furthermore, since sebum is contained in the fingerprint, light for readout passes over a non-uniform layer of sebum and, thereby, a tracking signal is disturbed, hence causing an erroneous jump to a neighboring track. In that case, the reducing the feedback gain of the tracking control is effective. Furthermore, the reducing the read speed is also effective. As described above, the fingerprint flag may be set because a large number of inter-layer interferences appeared in a short section. The influence on the AGC amplifier operations is also similar in this case to that exerted by fingerprints.

Accordingly, when it is determined that the factor of a read error is a fingerprint, retry operations are repeated until a successful read is achieved while these parameters are being changed.

FIG. 11 shows an example of a retry list for fingerprints (BD4X), which has been created by considering the above. First, cut-off frequency of the high-pass filter of the AGC amplifier input is changed, since the utmost effect is expected. Thereafter, the tracking gain is changed. A combination of both of them is used in order to perform trials. Next, the speed is reduced and, thereafter in the same manner as that in the above, trials are performed by changing the cut-off frequency of the high-pass filter of the AGC amplifier input and the tracking gain.

FIG. 12 shows an example of a retry list for deviations (BD4X). As described above, retry lists on deviations of tracking and focusing are put together into one list for the sake of a simplification of the system so that whichever deviation is detected, the same list is performed. Effective parameters for deviations are mainly the increasing of feedback control gains of tracking and focusing as well as the reducing of the read speed. Although the read speed is expected to be very effective as a retry parameter, it is put at the bottom of the list to avoid the reducing of the read speed as much as possible because the read speed is a crucial performance for a drive. The parameters of the retry list are applied in order from one placed on the top of the list until a successful read is achieved.

Next, the list for defects is described. There are mainly two cases, as a state of occurrence of a read error due to a defect: one where the length of the defect is as long as that of the error correction limit; and the other where tracking is deviated due to the defect so that a cluster on another track is read. In the former case, since the number of errors fluctuates statistically for each trial, it is expected that even the simple retries are sufficiently effective. In the latter case, improvement is expected by reducing the feedback gain to suppress an excessive fluctuation in a feedback system at the time of entering the defect. Operations of the tracking and focusing control system are held while passing over a defect. However, since the time which can be held is limited by the constraint of hardware, reduction of the speed may produce a disadvantageous situation so that the speed is not to be reduced.

FIG. 13 shows an example of a retry list, which has been created by considering the above. For each content for trials, the trials are to be repeated three times. In general, adaptive operations of the adaptive equalizer and the adaptive Viterbi decoder are held while passing through a defect. Immediately after passing the defect, the amplitude and the DC offset level of the read signal are changed due to influences of the transient response and the like. A certain effect can be expected by setting the time constants of the adaptive equalizer and the adaptive Viterbi decoder aiming to quicken the response to them. Since the focusing gain can be effective sometimes, it is placed at the bottom of the list.

Next, a retry list for SNR shortages and other factors is described. FIG. 14 shows an example for BD4X.

Any direct effects can not be expected to the binarization system by increasing the boost level to the shortest marks-and-spaces signals at the time of SNR shortage because the read signal processing system of this drive is equipped with an adaptive equalizer and a Viterbi decoder. However, especially in a system in which the jitter of the shortest marks-and-spaces is poor, such as BD, the operative clock jitter in the binarization system is suppressed by increasing the boost level for the shortest marks-and-spaces signal so that the error rate can be improved in some cases. This is because the operative clock in the binarization system is generated from the read signal using a digital PLL.

If the read speed is reduced, the bandwidth of the read signal processing system is narrowed, whereby noise power to be inputted is decreased so that an improvement on an error rate can be expected. However, from the viewpoint of the device performance, the read speed reduction should be avoided, thus it is put on the bottom of the list.

Incidentally, the present invention is effective at the time of recording for a certain aspect. For an optical disc, it is possible to observe the power of the reflected light from the recording surface of the disc with the read system even at the time of recording. At this time, when the recording beam passes over a fingerprint or a scratch and the like, the power of the reflected light changes as in the case of the read. Accordingly, this enables an estimation of the amount of the disturbance in read, consequently, the number of the symbol errors at the time of read can be estimated. By using this, recording defects due to the quality of a disc can be detected without a verify read. A superior point of this approach is that since the verify read is not necessary, the transfer speed as same as stream recording is achieved while recording defects can be detected. The process for when recording defects are detected is specified in advance. The content of that process is, in general, either to perform replacement processing of the defectively recorded RUB or to stop recording.

Second Embodiment

In many cases, fingerprints or scratches exist on part of a disc surface. In contrast, a great number of the inter-layer interferences on dual layer discs may appear in a large area of the disc depending on the disc condition. In some cases, the interferences may appear over almost entire disc surface. In such a case, read errors caused by the inter-layer interferences occur on various positions on the disc. Under such a situation, problems such as reduction of the average data transfer rate arise when retry operations such as those described above are repeated for every read error.

Therefore, in the present embodiment, the number of appearances of inter-layer interferences is monitored by using fingerprint flags even when read errors are not detected; and when it is determined that a probability of the appearance is high, a read parameter is automatically switched to a suitable one so that a read error does not easily occur.

Monitoring of the frequency of appearances of inter-layer interferences is described. Spatial intervals of appearances of inter-layer interferences depend on the rate of spatial variance rate of the interval between the two recording layers. That is, on parts where the layer interval changes drastically, the condition of the interference also changes drastically so that the intervals of the appearances become small. Read errors due to inter-layer interferences occur in cases when there are plural envelope defects due to inter-layer interference in a single RUB. Furthermore, suppose if the inter-layer interference is the only cause of the errors, it is considered that the total number of error bytes in one RUB is approximately proportional to the number of envelope defects which are due to the inter-layer interferences in that RUB. Accordingly, the state of inter-layer interferences can be detected by constantly monitoring the number of envelope defects appeared in one RUB. Specifically, the maximum appearance interval is set to be equal to the RUB, whereby measurement is made.

Figure 15:
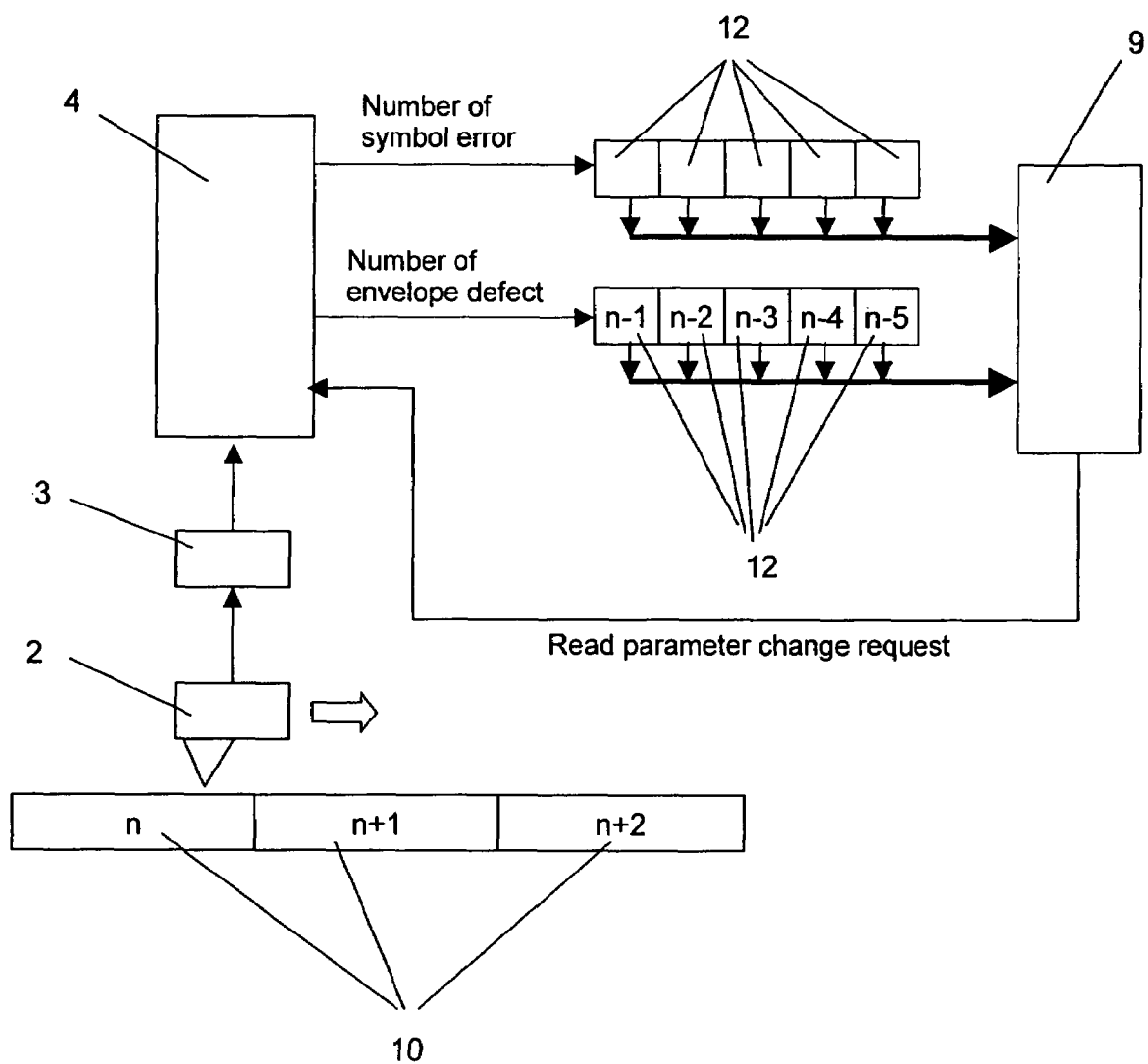
FIG. 15 is a view for showing a method of monitoring a frequency of appearances of inter-layer interferences.

FIG. 15 is a view for showing a mechanism of constantly monitoring the number of envelope defects. In many cases, the value of the envelope defect counter 7 is transferred to a serial memory 12 and stored therein for every time a RUB is read out since RUBs are consecutively read out. Although it is possible to provide a dedicated hardware for this operation, the operation is performed by using the firmware 9 in the present embodiment. The reason why the firmware is used is that use of the firmware enables more flexible designations of the number of results referred by tracking back the previous procedure and of forwarding addresses, for example. The number of symbol errors in each RUB is transferred to the memory consecutively and stored therein at the same time. This is to know the margin before a read error occurs from the number of errors which are actually observed.

The firmware 9 constantly monitors these values. The designated condition in which read conditions are decided to be changed is set in a way that both the number of appearances of envelope defects and the number of symbol errors exceed specified values (a specified value of the number of appearances: 3, a specified value of the number of symbol errors: 1000) in three or more RUBs among five consecutive RUBs. By making decisions by using both of the number of appearances and the number of symbol errors, appropriateness of changing the read condition is enhanced. Furthermore, the reason why the number of RUBs used for the decision is set to be 5 is that the number of RUBs on the outermost circumference of a disc is approximately 5.

The read parameters to be changed when it is decided that the frequency of the appearances of envelope defects due to the inter-layer interferences is high are the cut-off frequency of the high-pass filter of the AGC amplifier input and the tracking gain. When it is detected that envelope defects and symbol errors have exceeded those above-mentioned designated conditions, the firmware directs the DSP to change the read conditions; increases the cut-off frequency of the high-pass filter of the AGC amplifier input to a higher level than usual, and to increase the tracking gain. In the case of BD4X read, they are respectively 50 kHz and +1 dB. Incidentally, in either case before or after changing the read condition, the above condition is canceled at the time of a read retry after occurrence of a read error, and the same procedure as that in the first embodiment is used.

The present invention makes it possible to provide an optical disc drive provided with read capability not to be reduced due to an envelope defect of a readout signal.

What is claimed is:

1. An optical disc drive comprising:
   a pick-up which optically reads out information recorded on an optical disc, and which converts the information into a read signal; and
   a signal processing unit which processes the read signal;
   wherein the signal processing unit includes an envelope defect detector which detects an envelope defect of the read signal and a counter which counts the number of appearances of the envelope defect;
   read error factor detection means which detects an envelope defect as read error factors and other factors when read errors occur; and
   a storing unit which stores a retry list in which a read condition used at the time of a read retry is specified for each factor of the read errors;
   wherein, when read errors occur, a read condition being a suitable state against a factor of a read error detected by the read error factor detection means is selected from the retry list and applied to perform a read retry.

2. The optical disc drive according to claim 1, comprising means for synchronizing a recording unit block of information with a start position and/or an end position of a section in which the number of appearances of the envelope defect is counted by the counter.

3. The optical disc drive according to claim 1, wherein the envelope defect detector includes, as means for detecting a valley of an envelope of a readout signal, comparing means which compares, at each point of time, magnitudes of a sampled value of the readout signal and a threshold defining the valley; and means which measures a period for which sampled values of readout signals are successively smaller than the threshold defining the valley, based on relationships of the magnitudes compared by the comparing means.

4. The optical disc drive according to claim 1, wherein the envelope defect detector includes, as means for detecting a peak of an envelope of a readout signal, comparing means which compares, at each point of time, magnitudes of a sampled value of a readout signal and a threshold defining the peak; and means which measures a period of time for which an event lasts from a point of time at which it is determined by the comparing means that a sampled value of a readout signal exceeds the threshold defining the peak, the measurement being made when the event occurs in which, after being determined by the comparing means as described above, a sampled value becomes lower than the threshold and, thereafter, a sampled value again exceeds the threshold defining the peak within a period of time specified in advance.

5. The optical disc drive according to claim 1, comprising:
   means which counts the number of symbol errors of the readout signal;
   storing means which stores the number of appearances of the envelope defect and the number of symbol errors for every recording unit block; and
   means which changes read conditions when the number of appearances of the envelope defect and the number of symbol errors stored in the storing means satisfy conditions specified in advance.

6. An optical disc drive comprising:
a pick-up which optically reads out information recorded on an optical disc, and which converts the information into a read signal; and
a signal processing unit which processes the read signal;
wherein the signal processing unit includes an envelope defect detector which detects an envelope defect of the read signal and a counter which counts the number of appearances of the envelope defect;
means which counts the number of symbol errors of the readout signal;
storing means which stores the number of appearances of the envelope defect and the number of symbol errors for every recording unit block; and
means which changes read conditions when the number of appearances of the envelope defect and the number of symbol errors stored in the storing means satisfy conditions specified in advance.

7. The optical disc drive according to claim 6, comprising means for synchronizing a recording unit block of information with a start position and/or an end position of a section in which the number of appearances of the envelope defect is counted by the counter.

8. The optical disc drive according to claim 6, comprising:
read error factor detection means which detects an envelope defect as read error factors and other factors when read errors occur, and
a storing unit which stores a retry list in which a read condition used at the time of a read retry is specified for each factor of the read errors,
wherein, when read errors occur, a read condition being a suitable state against a factor of a read error detected by the read error factor detection means is selected from the retry list and applied to perform a read retry.

9. The optical disc drive according to claim 6, wherein the envelope defect detector includes, as means for detecting a valley of an envelope of a readout signal, comparing means which compares, at each point of time, magnitudes of a sampled value of the readout signal and a threshold defining the valley; and means which measures a period for which sampled values of readout signals are successively smaller than the threshold defining the valley, based on relationships of the magnitudes compared by the comparing means.

10. The optical disc drive according to claim 6, wherein the envelope defect detector includes, as means for detecting a peak of an envelope of a readout signal, comparing means which compares, at each point of time, magnitudes of a sampled value of a readout signal and a threshold defining the peak; and means which measures a period of time for which an event lasts from a point of time at which it is determined by the comparing means that a sampled value of a readout signal exceeds the threshold defining the peak, the measurement being made when the event occurs in which, after being determined by the comparing means as described above, a sampled value becomes lower than the threshold and, thereafter, a sampled value again exceeds the threshold defining the peak within a period of time specified in advance.

* * * * *